(No Model.)
D. B. HASELTON.
SAW FOR COTTON GINS, &c.
No. 293,576. Patented Feb. 12, 1884.
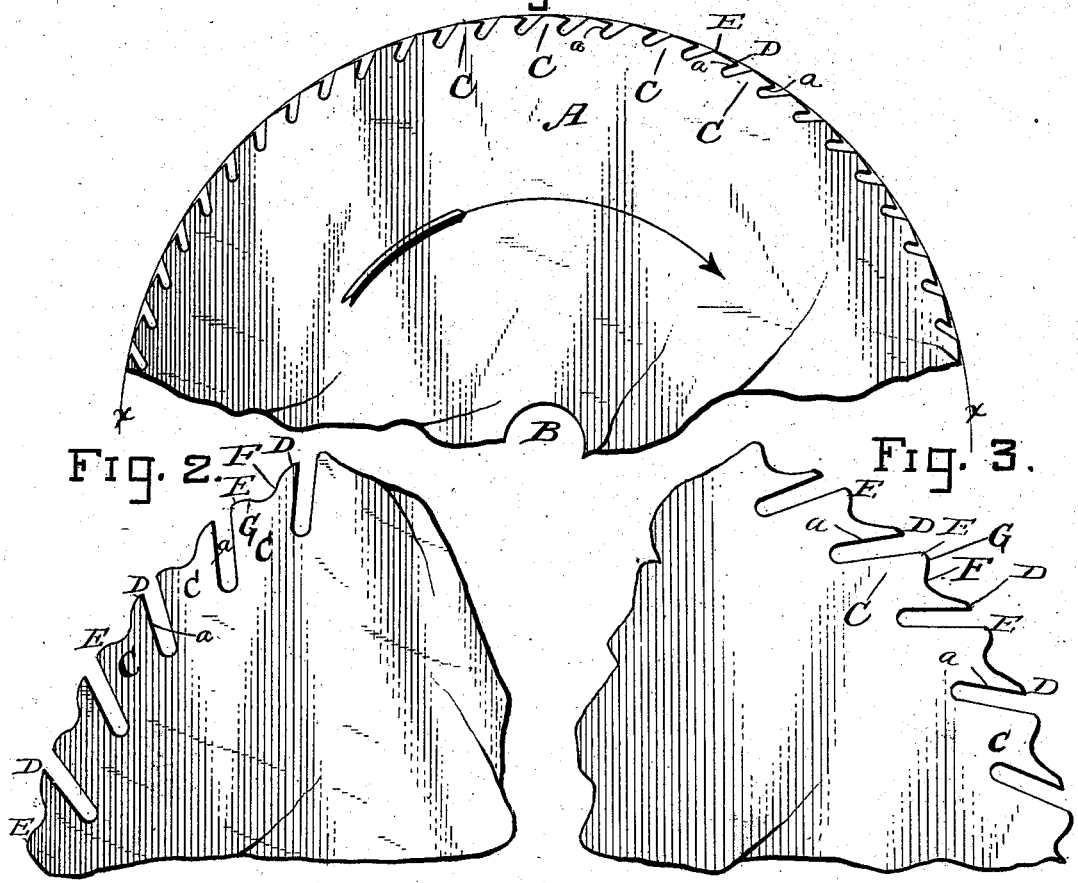
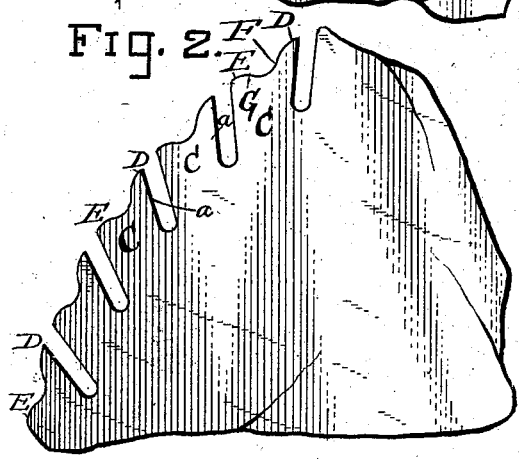
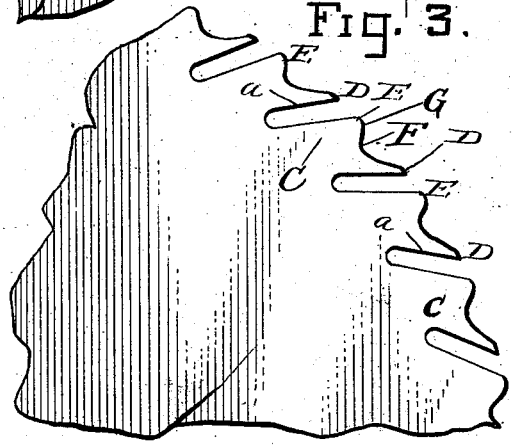
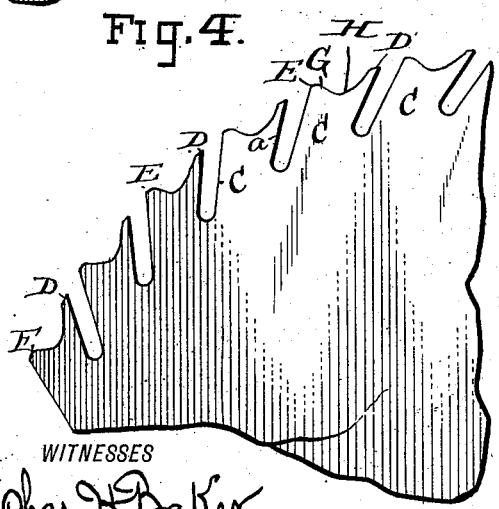
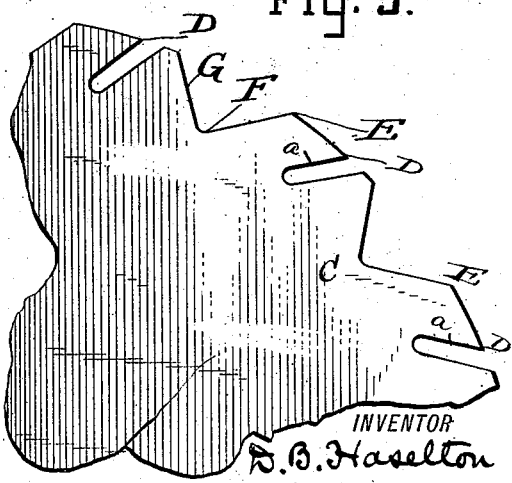
WITNESSES
Chas. H. Baker.
Frank Cadmus.
INVENTOR
D. B. Haselton
By H. J. Ennis
Attorney

United States Patent Office.

DANIEL B. HASELTON, OF CHARLESTON, SOUTH CAROLINA.

SAW FOR COTTON-GINS, &c.

SPECIFICATION forming part of Letters Patent No. 293,576, dated February 12, 1884.

Application filed November 17, 1883. (No model.)

*To all whom it may concern:*

Be it known that I, DANIEL B. HASELTON, a citizen of the United States, residing at Charleston, in the county of Charleston and State of South Carolina, have invented certain new and useful Improvements in Saws for Cotton-Gins, &c., of which the following is a specification, reference being had therein to the accompanying drawings.

My invention has relation to the construction of the teeth of the saws used in cotton-gins, pickers, harvesters, and similar machines for the treatment or preparation of cotton or other fibrous material; and the object of the invention is to so form or construct the teeth of saws used in this class of machines that said teeth will engage with and separate the cotton fiber, while the seeds, twigs, and other foreign matter are undisturbed; and to that end the novelty consists in protecting the points of the angular teeth of the saws, so that they will not engage with or act upon any hard or unyielding substance, while all elastic or fibrous matter—such as cotton, wool, and the like—will readily be seized by the teeth and separated from the refuse or foreign matter, as will be hereinafter more fully described.

In the accompanying drawings, the same letters of reference refer to the same parts of the invention.

Figure 1 is a side elevation of part of a saw, embodying my invention. Figs. 2, 3, 4, and 5 are modifications of the same.

A is a metal disk or saw, having the central opening, B, for mounting it upon its shaft in the usual manner. The periphery of this saw is provided with a series of serrations or teeth, C, of which D is the point or toe and E the heel, and, it being higher than the toe, as the saw revolves in the direction of the arrow acts as a guard for the point D of the following tooth, so as to prevent said toe from engaging any non-elastic substance, while the fibrous or elastic material, by virtue of its elasticity, will press down behind the heel E, where it will be caught upon the point D of the following tooth and carried forward, so as to separate it from the seeds, hulls, and all other foreign matter, which are left behind. Of course, it will be understood that any approved means may be employed to remove the fiber from the teeth at a convenient point in the revolution of the saw, and, as my invention is limited to the saw itself, it will be understood that I make no claim to the construction of the machine proper, as it is obvious that any way of mounting my saws in combination with ribs or combs and doffer-brushes will come within the scope of my invention.

In Fig. 1 the heel E of each tooth C is raised a little above the point D, so that it forms a guard or protection to the point of the tooth behind it and prevents any rigid substance catching upon them. This is very clearly illustrated by the circumferential line $xx$, which shows that the heels of the teeth form the true periphery of the saw, and, consequently, should there be any gritty matter in the cotton it cannot injure the points.

In Figs. 2, 3, 4, and 5 the face of the tooth between the point D and heel C has a recess, F, and, should a twig or other substance come into contact with the saw while it is revolving, the twig would fall into the recess F, and then come into contact with the inclined face G of said recess, and thereby be thrown forcibly outward from the saw.

A series of the saws may be bolted together upon a shaft with washers between the saws, so as to make a practically-solid cylinder, of which the heels of the teeth will form the surface or true periphery, and the toes or points of the teeth, being depressed, will be protected by said periphery.

Various other modifications will readily suggest themselves to those skilled in the art, as it is manifest that the form of the tooth is immaterial so long as the heel of the tooth is higher than its point, whereby the heel or base protects or guards the point of the tooth.

In my patent of June 28, 1881, the teeth are bent rearwardly and inwardly at their extremities, and this curved or hooked shape is objectionable, as there is a tendency of the fiber to hang on the teeth and clog; but in the present case the teeth are angular and present regular lines, and the breast $a$ is plane, this angular construction facilitating the ready and rapid removal of the cotton fiber by the brushes.

Having thus fully described my invention, what I claim as new and useful, and desire to secure by Letters Patent of the United States, is—

1. A saw provided with a series of angular teeth having their heels higher than their toes, as and for the purpose set forth.

2. A saw having a series of angular teeth, C, the points or toes D thereof being lower than the heels E, and having plane breasts a, as set forth.

3. A saw having angular teeth C, provided with plane breasts a, recesses F, and heels E higher than the points or toes D, as set forth.

In testimony whereof I affix my signature in presence of two witnesses.

DANIEL B. HASELTON.

Witnesses:
H. J. ENNIS,
CHAS. H. BAKER.